March 13, 1956   F. H. CAREY   2,738,003
LIQUID FUEL SUPPLY SYSTEMS FOR CONTINUOUS
COMBUSTION TURBINE ENGINES
Filed Jan. 19, 1952

INVENTOR
FREDERICK H. CAREY
By Reynolds, Beach & Christensen
ATTORNEYS

United States Patent Office 2,738,003
Patented Mar. 13, 1956

2,738,003

LIQUID FUEL SUPPLY SYSTEMS FOR CONTINUOUS COMBUSTION TURBINE ENGINES

Frederick Henry Carey, Cheltenham, England, assignor to Dowty Equipment Limited, Cheltenham, England Application January 19, 1952, Serial No. 267,266

2 Claims. (Cl. 158—36.4)

This invention is concerned with systems by which liquid fuel is supplied to spill type burner nozzles of continuous combustion turbine engines, especially for aircraft propulsion.

The main object of the invention is to provide a simplified fuel system for such a purpose incorporating a single fuel pump of the positive displacement type, driven by the engine, hence variable in its delivery as the engine speed varies, and an all-speed governor for controlling the supply of fuel to the burner nozzles of the engine.

Such systems have most frequently employed heretofore two pumps, namely a circulating pump operating in a closed circuit which includes the spill burners, to maintain that circuit full of fuel at all times but not in itself under normal conditions effecting discharge at the burner nozzle, and a supply pump which delivers fuel in regulated amounts to the closed circuit, whereby such regulated amounts are discharged at the burner nozzle. It is necessary to provide various throttling, governing, and auxiliary mechanisms to regulate the amount of fuel supplied by the supply pump, or to divert a part thereof elsewhere under certain conditions among which mechanisms are such as an all-speed governor, an over-speed governor, an acceleration control, starting controls, afterburner controls, etc., all additional to and cooperating under various conditions with a manually controlled throttle, and all others cooperating with the all-speed governor.

By this present invention there is provided a basic fuel system for aircraft propulsion operating with spill burners as before, which incorporates only a single pump, but especially suited as a system to the addition or inclusion of the various other mechanisms, such as those indicated above, which experience has shown are highly desirable in the service indicated. Thereby the basic system, including a basic servo vent-controlled throttle, is made lighter and simpler, yet without sacrificing the flexibility and variety of controls which are so necessary in such service, nor the interrelationship of other controls one with another and each with the all-speed governor and with the basic servo vent-controlled throttle.

Figure 1:
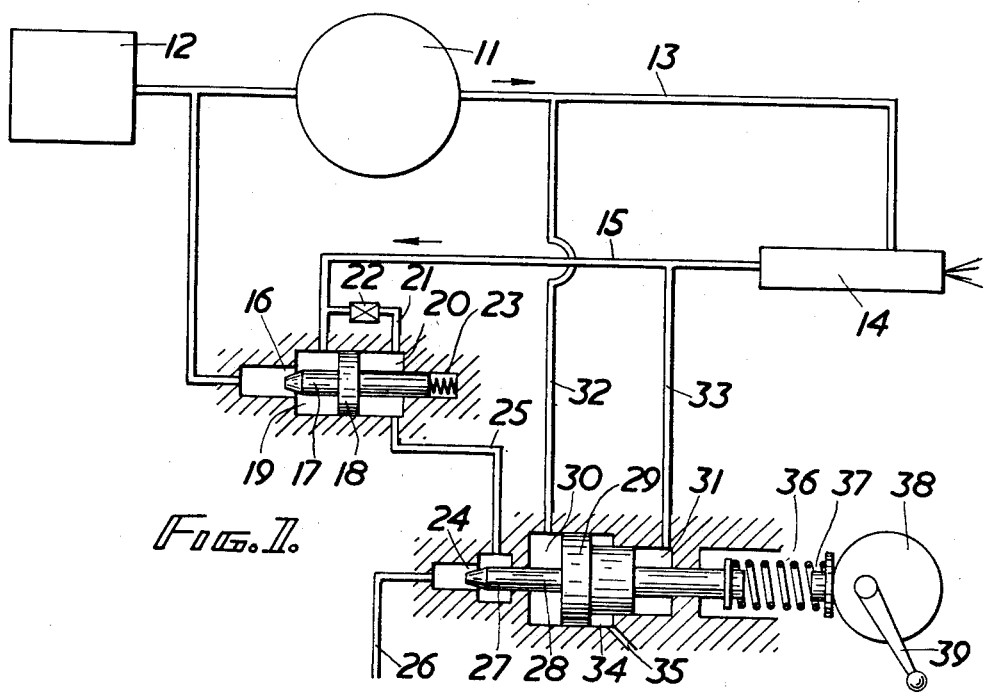
Figure 2:
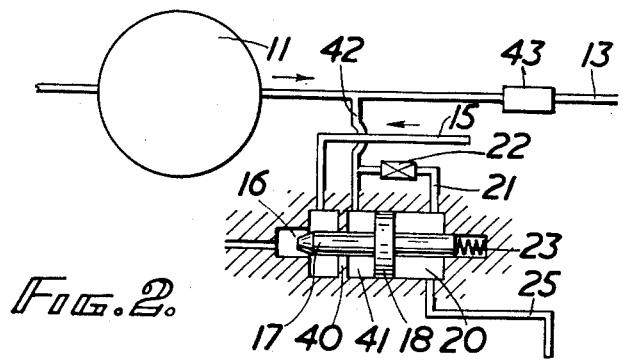

The invention is described with reference to the accompanying diagrammatic drawings, of which:

Figure 1 represents the preferred system; and
Figure 2 is a detailed modification.

In the system shown in Figure 1, a single engine-driven pump 11 withdraws fuel from a tank 12 and feeds it along a delivery line 13 to the inlets of the burner nozzles of the engine, of which one is indicated at 14. The return line 15 from the nozzles leads back to the inlet side of the pump 11 through a variable orifice 16 which is regulated by a servo vent-controlled throttle valve 17 of the pressure-balanced type. The valve 17 has a piston 18 which separates a cylindrical chamber into compartments 19 and 20. The return line 15 opens into the compartment 19 and a branch line 21 with a fixed restriction 22 leads from the line 15 to the compartment 20. The valve 17 is loaded in the closing sense by a light spring 23. This affords a basic control, subject to movement by change in the pressure differences, applied manually or automatically, to alter the equilibrium established between opposite faces of the piston 18.

For example, the compartment 20 may lead to one or to a number of vent openings which are governed to exercise different controls over the throttle 17. These controls may be exercised by an over-speed governor, an acceleration control, and an all-speed governor, or to several thereof, as may be required. In the drawing an all-speed governor only is shown, and this has a vent 24 at the end of a vent line 25 from the chamber 20. When the vent 24 is open, fuel can flow from the return line 15 through the fixed restriction 22 and branch line 21 to the compartment 20, and from the compartment 20 along the vent line 25, through the vent 24 and along a line 26 to the tank 12 or to any other convenient part of the system at low pressure. When such flow occurs there is a pressure drop across the restriction 22, and the resulting pressure difference, or change therein, acting on the piston 18, locates the throttle 17 in a position which determines the rate of flow from the nozzles 14 to the inlet side of the pump 11. This rate of flow determines the amount of fuel that is discharged through the discharge orifices of the burners or equivalent. It will be understood that if the vent 24 should be enlarged there will be increased flow through the restriction 22 with a resulting increased pressure difference between compartments 19 and 20 acting on the piston 18. The throttle 17 will therefore move with the piston 18 to enlarge the orifice 16 which will cause more fuel to return to the inlet side of the pump with consequent less discharge from the nozzles. The vent 24 is regulated by a closure member 27. The throttle valve 17 with its associated piston 18, the vent pipe 25, and vent valve 24, 27 constitues a fluid-pressure servo device by means of which the return flow from the burners is regulated.

The closure member 27 of the fluid-pressure servo device is formed at the end of a stem 28 of a differential area piston 29 operating slidably within a suitably stepped bore forming with the piston 29 a larger area compartment 30 and a smaller area compartment 31. Fuel at nozzle inlet pressure reaches the compartment 30 through a branch line 32, while fuel at nozzle return pressure reaches the compartment 31 along a branch line 33. Thereby the piston 29 is a means to sense the pressure difference across the burners, or any change in that pressure difference, whatever may be the cause of such change. The annular space 34 between the steps of the piston 29 and bore is vented to atmosphere through an opening 35. The only reason the piston 29 is of different areas is to maintain it in equilibrium by two opposed forces of which one is, in part, a mechanically variable force, for control, hence its supplemental hydraulic force must be less than the opposing hydraulic force which alone balances the combined mechanical and hydraulic forces. As so far described, however, the vent closure member 29 is biased to enlarge the vent 24 because the greater pressure in the compartment 30 acts over a greater area of the piston 29 than does the lower pressure in the compartment 31. The vent closure member 27 is loaded in the closing sense by a spring 36, supplementing the hydraulic force in the compartment 31, which reacts between the end of an extension of the stem 28 and a movable abutment 37, the position of the latter being determined by the angular setting of an eccentric cam 38 governed by a manual control lever 39. As is obvious, the cam 38 and spring 36 are representative of any suitable control device or devices, manual or automatic, which may control the engine fuel supply through modification of the all-speed governor setting.

For any given angular setting of the cam 38, the spring 36 will exert a predetermined closing load upon the vent closure member 27 and this will have to be balanced by a corresponding pressure difference in the compartments 30 and 31. As this pressure difference is derived from the pressure difference between the upstream and downstream sides of the nozzles, and as the engine-driven pump is of the positive displacement type, it follows that such pressure difference will vary substantially as a function of the speed of the engine. When some selected speed has been attained the vent closure member 27 with its differential area piston 29 will be in a state of equilibrium with the force of spring 36, and the throttle 17 of the variable orifice 16 will also be in a state of equilibrium, so that the position of the throttle 17 is in effect determined by the loading given to the vent closure member 27 by the spring 36. Suppose, for example, that the load on the engine decreases; the engine speeds up, and so, too, does the pump 11. The pump delivers more fuel along the delivery conduit 13, so that the pressure difference across the piston 29 increases. The piston 29 moves to the right as a result, moving with it the closure member 27, in opposition to the load of the spring 36. The flow of fuel through the vent line 25, therefore, increases and thus acts in a manner well known in the art to draw the piston 18 to the right, to enlarge the throttle opening 16. The fuel flow in the return line 15, therefore, increases while the delivery from burners correspondingly decreases. Thereby the engine speed will fall to a level at which equilibrium is again established between the pressures differentially acting on the piston 29 and the load of spring 36. Any decrease in engine speed arising from an external cause will react in the converse manner. If the operator wishes to increase the speed of the engine he will move the control lever 39 to increase the compression in the spring 36. The immediate effect will be to tend to restrict the vent 24 which will react upon the throttle 17 of the basic servo vent-controlled throttle to reduce the pressure difference in the compartments 19 and 20 of the throttle 17. The throttle 17 will therefore tend to restrict the orifice 16 which will cause more fuel to be discharged into the combustion chamber of the engine. The speed of the engine will therefore increase until the pressure difference in the compartments 30 and 31 balances the increased spring loading. The reverse will occur if the pilot moves the lever 39 to reduce the compression in the spring 36.

In the modification shown in Figure 2, the pressure to operate the pressure-balanced throttle valve 17 of the basic control is taken from the delivery line 13 instead of from the return line 15 as in Figure 1. In this modification, in which similar reference numerals are used to denote similar parts, the cylindrical chamber in which the piston 18 slides has a partition 40 which separates fuel at the nozzle return pressure from the left hand face of the piston 18, and the space 41 at this left hand face is exposed to nozzle delivery pressure along a branch line 42. The restriction 22 and branch line 21 lead from this line 42 to the compartment 20 at the right hand side of the piston 18. With this modification it is necessary to provide in the delivery line 13 a pressurising valve 43 which prevents pressure in the branch line 42 to the throttle from falling below a predetermined operating pressure. This modified basic servo vent-controlled throttle is itself controllable in virtually the same way and by the same supplemental controls as is the basic control of Figure 1.

The all-speed governor arranged in accordance with the invention in the single pump spill burner nozzle system provides a fuel supply system which is simple and which provides for effective and stable control over the engine speed. Having provided a basic control such as includes a servo vent-controlled throttle valve, and an all-speed governor, it becomes clear that various supplemental controls may be applied to that throttle valve, or to the all-speed governor, to alter the equilibrium of pressures in either or both thereof, and so to attain the variety, nicety, and complexity of control, in such a simplified single pump spill burner system, such as heretofore has been attained only in the more complex two-pump systems.

I claim:

1. A system for supplying liquid fuel from a low pressure fuel source to the spill burners of an aircraft continuous combustion turbine engine, for continuous discharge from the discharge orifice of the swirl chamber of each such burner, and for return by way of the spill orifice of each such burner to the low pressure source, which system comprises, in combination; an engine-driven fuel pump, a fuel-filled circuit including a high pressure delivery conduit extending from the pump's outlet and adapted for connection to the inlet of each burner, a supply conduit adapted for connection to the fuel source and connected for delivery to the pump's intake, and a return conduit adapted for connection at one end to the spill orifice of each burner and at its other end to a low pressure portion of said circuit; a throttle-valve interposed in said return conduit; a fluid-pressure servo device connected in the return conduit of said fuel-filled circuit between low pressure and higher pressure sources therein, said servo device including a high and low pressure region and including a vent pipe leading from the low pressure region and a valve member in the vent pipe, said throttle-valve operatively connected to said servo device in a sense to be opened upon opening of said valve member, said servo device being responsive to pressure changes in said vent pipe; a speed governor including a first loading means, said first loading means including a pressure responsive member having a first face connected to the vent valve member, a high pressure duct leading from the delivery conduit to said first face of the pressure responsive member, biasing the vent valve member in a vent-opening sense, and said first loading means including also a low pressure duct leading from the return conduit to the opposite face of said pressure responsive member whereby said pressure responsive member is sensitive to variation in the pressure across the burners resulting from change of speed of the engine-driven pump, thereby through said servo device to control the return of fuel past the throttle-valve to the low pressure side of the system; and a second loading means operative to bias the vent valve member in the vent-closing sense, said second loading means including a spring acting upon said valve member and means to vary the loading of the spring.

2. A fuel supply system as in claim 1, wherein the first face of the pressure responsive member is of larger area than the opposite face.

References Cited in the file of this patent

UNITED STATES PATENTS

| 1,824,952 | Graham et al. | Sept. 29, 1931 |
|---|---|---|
| 2,438,998 | Halford | Apr. 6, 1948 |
| 2,523,214 | Ifield | Sept. 19, 1950 |
| 2,536,556 | Lawrence | Jan. 2, 1951 |
| 2,564,263 | Ifield | Aug. 14, 1951 |
| 2,604,149 | Wynne | July 22, 1952 |
| 2,619,163 | Wynne et al. | Nov. 25, 1952 |